United States Patent
Ammon

(10) Patent No.: US 10,161,263 B2
(45) Date of Patent: Dec. 25, 2018

(54) BEARING HOUSING

(71) Applicant: Bosch Mahle Turbo Systems GmbH & Co. KG, Stuttgart (DE)

(72) Inventor: Volkhard Ammon, Pliezhausen (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 33 days.

(21) Appl. No.: 15/261,461

(22) Filed: Sep. 9, 2016

(65) Prior Publication Data
US 2017/0074119 A1 Mar. 16, 2017

(30) Foreign Application Priority Data

Sep. 11, 2015 (DE) .................. 10 2015 217 443

(51) Int. Cl.
*F16C 35/02* (2006.01)
*F01D 25/16* (2006.01)
*F01D 25/24* (2006.01)
*F16C 35/067* (2006.01)

(52) U.S. Cl.
CPC .......... *F01D 25/162* (2013.01); *F01D 25/24* (2013.01); *F16C 35/067* (2013.01); *F05D 2220/40* (2013.01); *F05D 2230/23* (2013.01); *F05D 2230/60* (2013.01); *F05D 2250/294* (2013.01); *F16C 35/02* (2013.01); *F16C 2360/24* (2013.01)

(58) Field of Classification Search
CPC ...... F01D 25/162; F01D 25/24; F16C 35/067; F16C 35/02; F16C 2360/24; F16C 2226/52
See application file for complete search history.

(56) References Cited

U.S. PATENT DOCUMENTS

| | | | | |
|---|---|---|---|---|
| 2,646,210 A | * | 7/1953 | Kohlmann | F01D 9/045 384/277 |
| 3,106,381 A | * | 10/1963 | Leins | F01D 25/14 415/119 |
| 5,062,772 A | * | 11/1991 | Shimizu | F04B 27/0882 417/269 |
| 5,106,271 A | * | 4/1992 | Shimizu | F04B 27/0882 417/222.2 |
| 9,181,955 B1 | * | 11/2015 | House | F16C 27/045 |
| 9,328,628 B2 | * | 5/2016 | Schenkenberger | F01D 25/162 |

(Continued)

FOREIGN PATENT DOCUMENTS

| DE | 202008014925 U1 | 2/2009 |
|---|---|---|
| DE | 102008050325 A1 | 4/2010 |
| DE | 102009058068 A1 | 6/2011 |

(Continued)

OTHER PUBLICATIONS

English abstract for DE-102010025575.
(Continued)

*Primary Examiner* — Thomas R Hannon
(74) *Attorney, Agent, or Firm* — Fishman Stewart PLLC

(57) ABSTRACT

A bearing housing of an exhaust gas turbocharger may include an encircling and inwardly open groove arranged in the bearing housing. The bearing housing may also include a housing cover that may have at least one forming portion formed plastically into the groove. The housing cover may be secured on the bearing housing via the at least one forming portion.

18 Claims, 1 Drawing Sheet

(56) References Cited

U.S. PATENT DOCUMENTS

2013/0223772 A1    8/2013  Holzschuh et al.

FOREIGN PATENT DOCUMENTS

| DE | 102010025575 A1 | 9/2011 |
| DE | 102010010965 A1 | 11/2011 |
| DE | 102011075517 A1 | 12/2011 |
| DE | 112011102808 T5 | 7/2013 |
| EP | 0599520 A1 | 6/1994 |
| WO | WO-2010/002717 A2 | 1/2010 |
| WO | 2015130474 A1 | 9/2015 |

OTHER PUBLICATIONS

English abstract for DE-102010010965.
German Search Report for DE-102015217443.3, dated Jun. 22, 2016.
English abstract for DE-102009058068.
English abstract for DE-102008050325.
European Search Report for EP Application No. 16188101.6, dated Feb. 2, 2017.
English Abstract of DE 112011102808.

\* cited by examiner

BEARING HOUSING

CROSS-REFERENCE TO RELATED APPLICATIONS

This application claims priority to German Patent Application No. DE-10 2015 217 443.3, filed on Sep. 11, 2015, the contents of which is hereby incorporated by reference in its entirety.

TECHNICAL FIELD

The present invention relates to a bearing housing with a housing cover. The invention also relates to an exhaust gas turbocharger with such a bearing housing and to a method for mounting a housing cover in such a bearing housing.

BACKGROUND

DE 10 2011 075 517 A1 discloses a bearing housing of a charging device, in particular of an exhaust gas turbocharger of a motor vehicle, with a bearing housing cover formed from metal. A first thread is then provided on the latter and a second thread formed in a complementary manner with respect to the first thread is provided on the bearing housing, and therefore the bearing housing cover can be screwed and secured on the bearing housing by means of a rotational movement. This is in particular intended to be able to reduce the diversity of parts.

DE 10 2009 058 068 A1 likewise discloses a bearing housing of a charging device with a bearing housing cover via which an axial bearing for a shaft is secured in the axial direction. The bearing housing here has an undercut-like annular groove, wherein a disk-spring-like securing element is additionally provided, said securing element prestressing the bearing housing cover against the axial bearing and/or against the bearing housing by an outer edge of said securing element engaging in the bearing-housing-side annular groove and by an inner edge of same being supported on the bearing housing cover. This is intended in particular to be able to simplify the construction.

EP 0 599 520 B1 discloses an axial bearing of a turbocharger for a rotor shaft with a main body part which has a bore which is designed in such a manner that it can receive a hub part of a pressure ring of a turbocharger.

In general, the prior art discloses various bearing housings and exhaust gas turbochargers in which a housing cover is fastened to the bearing housing in a wide variety of ways. These include in particular the use of screws, securing rings or bayonet fasteners which are intended at the same time to ensure a simple and permanent securing of the housing cover on the bearing housing.

SUMMARY

The present invention is concerned with the problem of specifying, for a bearing housing of the type in question, an improved or at least an alternative embodiment which is distinguished in particular by a housing cover being fastened to a bearing housing without additional fastening means, such as, for example, screws or the like.

This problem is solved according to the invention by the subject matter of independent Claim 1. Advantageous embodiments are the subject matter of the dependent claims.

The present invention is concerned with the general concept of providing a housing cover of a bearing housing of a charging device, for example of an exhaust gas turbocharger, with at least one forming portion and, as a counterpart in a bearing housing of a charging device, for example of an exhaust gas turbocharger, of introducing a corresponding undercut contour in which the forming portion can engage and can thereby secure the housing cover on the bearing housing. For this purpose, the bearing housing has an encircling and inwardly open groove which constitutes the undercut contour. The housing cover has the at least one forming portion, which can optionally be designed in the manner of a circular segment, that is to say is interrupted over a circumference, or else runs entirely around the circumference. According to the invention, the at least one forming portion is now formed or pressed plastically into the groove of the bearing housing and thereby secures the housing cover on the bearing housing. The great advantage of the invention is that additional fastening means, such as screws or clamping pins, can be completely dispensed with, as a result of which the diversity of parts and also the storage and logistic costs associated therewith are reduced. At the same time, a nonreleasable connection of the housing cover to the bearing housing can be produced by the at least one forming portion and the associated groove, as a result of which retrospective and undesirable manipulations are at least made difficult. Furthermore, by means of a corresponding symmetrical arrangement of a plurality of forming portions, a symmetrical introduction of force can be achieved and an undesirable distortion of the housing cover can thereby be avoided. The extremely short mounting times of the housing cover on the bearing housing are also of particular advantage.

In an advantageous development of the solution according to the invention, the groove is designed in such a manner that it exerts an axial force on the forming portion and therefore on the housing cover when the forming portion is formed into the groove. By this means, a spring prestress of the housing cover in the bearing housing can be achieved, as a result of which, for example, rattling or an inadvertent release of the housing cover can be avoided over the long term.

The groove expediently has a triangular, an oval, a rectangular or a semicircular cross section. In particular, a triangular cross section permits the previously mentioned effect, according to which a groove wall and therefore the groove exerts an axial force on the forming portion and therefore on the housing cover when the forming portion is formed into the groove.

In a further advantageous embodiment of the solution according to the invention, at least two forming portions designed as snap hooks are provided, and the housing cover is pressed in the bearing housing with a press fit. In such an embodiment, the forming portions of the housing cover are already formed prior to the mounting of the latter on the bearing housing, as a result of which the mounting of the housing cover is simplified once again.

In an alternative embodiment of the solution according to the invention, the forming portion is formed into the groove by roller-burnishing, by wobble riveting or by magnetic pulse forming. With such a production of the form fit between the at least one forming portion and the groove in the bearing housing, the forming portions are therefore secured in the groove only after the housing cover is mounted on the bearing housing.

The present invention is furthermore based on the general concept of specifying a method for mounting a housing cover in a bearing housing, in which first of all a coil connected to a capacitor is placed around the bearing housing. The coil is subsequently subjected to a voltage of greater than 7 kV which is applied abruptly by the capacitor, as a result of which Eddy currents arise in the bearing housing cover, said Eddy currents generating a shocklike and very high Lorentz force. The latter forms the at least one forming portion of the housing cover radially and at the same time presses the housing cover axially in the direction of the axial bearing or into the bearing housing. A method of this type is a reliable way of mounting the housing cover on the bearing housing.

Further important features and advantages of the invention emerge from the dependent claims, from the drawings and from the associated description of the figures with reference to the drawings.

It goes without saying that the features mentioned above and those which have yet to be explained below are usable not only in the respectively stated combination, but also in other combinations or on their own without departing from the scope of the present invention.

BRIEF DESCRIPTION OF THE DRAWINGS

Preferred exemplary embodiments of the invention are illustrated in the drawings and are explained in more detail in the description below, wherein the same reference signs refer to identical or similar or functionally identical components.

In the drawings, in each case schematically.

DETAILED DESCRIPTION

Figure 1:
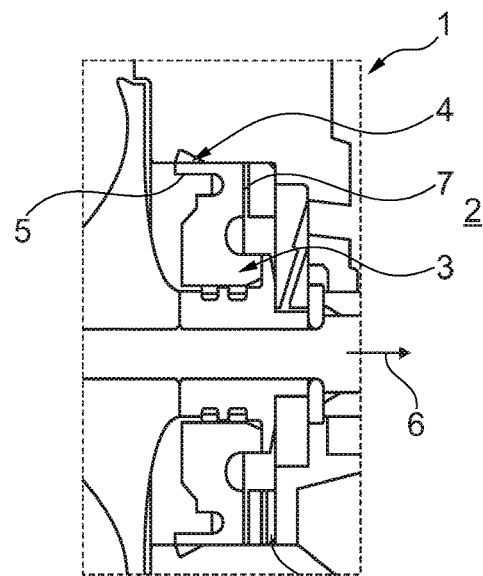
FIG. 1 shows a sectional illustration through a bearing housing according to the invention.

According to FIG. 1, a bearing housing 1 according to the invention of an exhaust gas turbocharger 2 has a housing cover 3. An encircling and inwardly open groove 4, which can also be referred to more generally as an undercut contour, is provided in the bearing housing 1. The housing cover 3 has at least one forming portion 5 which can extend in a completely encircling manner around the circumference of the housing cover 3 or else can be formed in an interrupted manner in the circumferential direction and, as a result, in the manner of a circular segment. The at least one forming portion 5 is formed plastically here into the groove 4, that is to say into the undercut contour, of the bearing housing 3, and thereby secures the housing cover 3 on the bearing housing 1. The great advantage of such a securing of the housing cover 3 on the bearing housing 1 resides in the fact that no additional fastening means, such as, for example, securing rings, screws or complicated closures, such as, for example, a bayonet fastener, are required.

Figure 2:
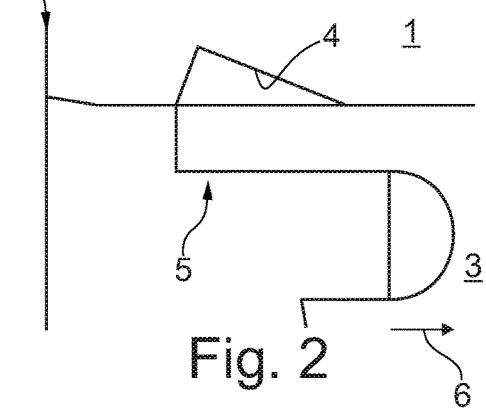
FIG. 2 shows an illustration of a detail from FIG. 1 in the region of a forming portion of a housing cover.

The groove 4 is preferably designed here in such a manner that it exerts or implements an axial force in the axial direction 6 on the forming portion 5 and therefore on the housing cover 3 when the forming portion 5 is formed into the groove 4. Looking at the groove 4 according to FIGS. 1 and 2, it can be seen that said groove has a triangular cross section, wherein, of course, an oval, a rectangular or a semicircular cross section would alternatively also be conceivable. The groove 4 is customarily bevelled in such a manner that the previously mentioned axial force arises when the housing cover 3 or the forming portions 5 thereof are formed. By provision of a plurality of forming portions 5, the rigidity of the housing cover 3 can be reduced, and therefore axial tolerances can be compensated for by the spring effect arising therefrom. Contact surfaces between the housing cover 3, on the one hand, and the groove 4, on the other hand, in the bearing housing 1 are preferably designed here in such a manner that they form a sealing surface, for which purpose they have a predefined smoothness or roughness. It is of particular advantage in this connection if the forming portion 5 lies in a form-fitting manner in the groove 4. In order to be able to reduce a stress concentration, the groove 4 can also have rounded corners.

In general, the forming portions 5 can already be formed on the housing cover 3 prior to the mounting of the latter on the bearing housing 1, or else only after the mounting. In the case of a prior forming, it is possible, for example, for at least two forming portions 5 designed as snap hooks to be provided and for the housing cover 3 to be pressed in the bearing housing 1 with a press fit. In this case, the press fit represents the required sealing function.

If the forming portions 5 are formed only after the housing cover 3 is mounted in the bearing housing 1, this can take place, for example, by roller-burnishing, by wobble riveting, by means of a hydraulic diaphragm or by magnetic pulse forming. Magnetic pulse forming, in particular, constitutes here a virtually wear-free forming method in which an additional tool is not required. The magnetic pulse forming takes place here, for example, as follows: first of all a coil which is connected to a capacitor is placed around the bearing housing 1 and the coil is subsequently charged with a voltage of greater than 7000 V which is applied abruptly by the capacitor. Said abrupt discharging generates a shocklike and very high Lorentz force which radially forms the forming portions of the housing cover 3 and at the same time presses the housing cover 3 in the axial direction 6 into the bearing housing 1 in the direction of the axial bearing.

Figure 3:
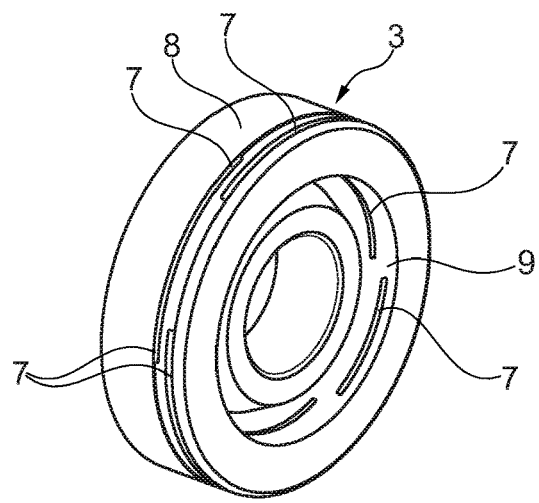
FIG. 3 shows a view of a housing cover with slots.

Looking at FIGS. 1 and 3, circular-segment-like slots 7 can be seen there on the housing cover 3. At least two of these slots 7 are arranged offset with respect to one another in the axial direction and overlap in the circumferential direction. Other slots 7 in turn do not overlap in the circumferential direction. These slots 7 make it possible to achieve an axial elasticity and therefore an axial spring action of the housing cover 3, by means of which in particular axial tolerances can also be compensated for. The slots 7 completely penetrate here through the housing cover 3 in the radial direction, and therefore said slots pass from an outer lateral surface 8 through as far as an inner lateral surface 9.

The following substantial advantages can be achieved with the bearing housing 1 according to the invention:
 further fastening elements such as, for example, screws or securing rings are dispensed with,
 sealing points under the screw heads are likewise dispensed with,
 a permanent and nonreleasable connection of the housing cover 3 in the bearing housing 1 is produced,
 an O-ring seal can be dispensed with,
 saving on material is possible by means of a blank produced without cutting (cast part, forged part or nonwoven pressed part),
 by means of a symmetrical introduction of force, an undesirable distortion of the housing cover 3 can be avoided,
 extremely short mounting times by means of the forming operation.

The invention claimed is:
1. A bearing housing of an exhaust gas turbocharger, comprising:

an encircling and inwardly open groove arranged in the bearing housing; and a housing cover having at least one forming portion formed plastically into the groove and via which the housing cover is secured on the bearing housing;

wherein the at least one forming portion includes at least two forming portions designed as snap hooks, and the housing cover is pressed in the bearing housing with a press fit.

2. A bearing housing according to claim 1, wherein the groove is configured to exert an axial force on the at least one forming portion and the housing cover when the forming portion is being formed into the groove.

3. A bearing housing according to claim 2, wherein the groove has a triangular cross section.

4. A bearing housing according to claim 2, wherein the at least one forming portion is formed into the groove by one of roller-burnishing, wobble riveting, and magnetic pulse forming.

5. A bearing housing according to claim 1, wherein the groove has a triangular cross section.

6. A bearing housing according to claim 5, wherein the at least one forming portion is formed into the groove by one of roller-burnishing, wobble riveting, and magnetic pulse forming.

7. A bearing housing according to claim 1, wherein the at least one forming portion is formed into the groove by one of roller-burnishing, wobble riveting, and magnetic pulse forming.

8. A bearing housing according to claim 1, wherein the housing cover is accommodated in a form-fitting manner in the bearing housing.

9. A bearing housing according to claim 1, wherein the housing cover has circular-segment-like slots.

10. A bearing housing according to claim 9, wherein at least two circular-segment-like slots are arranged offset with respect to each other in an axial direction and overlap in a circumferential direction.

11. A exhaust gas turbocharger comprising:
a bearing housing;
an encircling and inwardly open groove arranged in the bearing housing; and
a housing cover having at least one forming portion formed plastically into the groove and via which the housing cover is secured on the bearing housing;
wherein the at least one forming portion includes at least two forming portions designed as snap hooks, and the housing cover is pressed in the bearing housing with a press fit or
wherein the housing cover has circular-segment-like slots.

12. An exhaust gas turbocharger according to claim 11, wherein the groove is configured to exert an axial force on the at least one forming portion and the housing cover when the forming portion is being formed into the groove.

13. An exhaust gas turbocharger according to claim 11, wherein
the groove has a triangular cross section.

14. An exhaust gas turbocharger according to claim 11, wherein the at least one forming portion includes at least two forming portions designed as snap hooks, and the housing cover is pressed in the bearing housing with a press fit.

15. An exhaust gas turbocharger according to claim 11, wherein the housing cover has circular-segment-like slots.

16. An exhaust gas turbocharger according to claim 15, wherein at least two circular-segment-like slots are arranged offset with respect to each other in an axial direction and overlap in a circumferential direction.

17. A bearing housing of an exhaust gas turbocharger, comprising:
an encircling and inwardly open groove arranged in the bearing housing; and
a housing cover having at least one forming portion formed plastically into the groove and via which the housing cover is secured on the bearing housing;
wherein the housing cover has circular-segment-like slots.

18. A bearing housing according to claim 17, wherein at least two circular-segment-like slots are arranged offset with respect to each other in an axial direction and overlap in a circumferential direction.

* * * * *